J. J. DOWLING.
ELECTRICAL MEANS FOR DETECTING, OBSERVING, INDICATING, MEASURING, OR UTILIZING MINUTE MOVEMENTS.
APPLICATION FILED MAY 17, 1921.
1,431,638.
Patented Oct. 10, 1922.
2 SHEETS—SHEET 1.
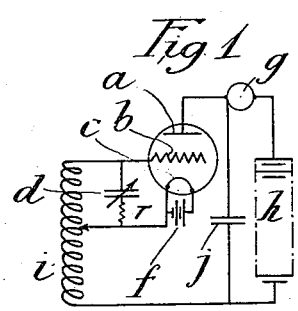
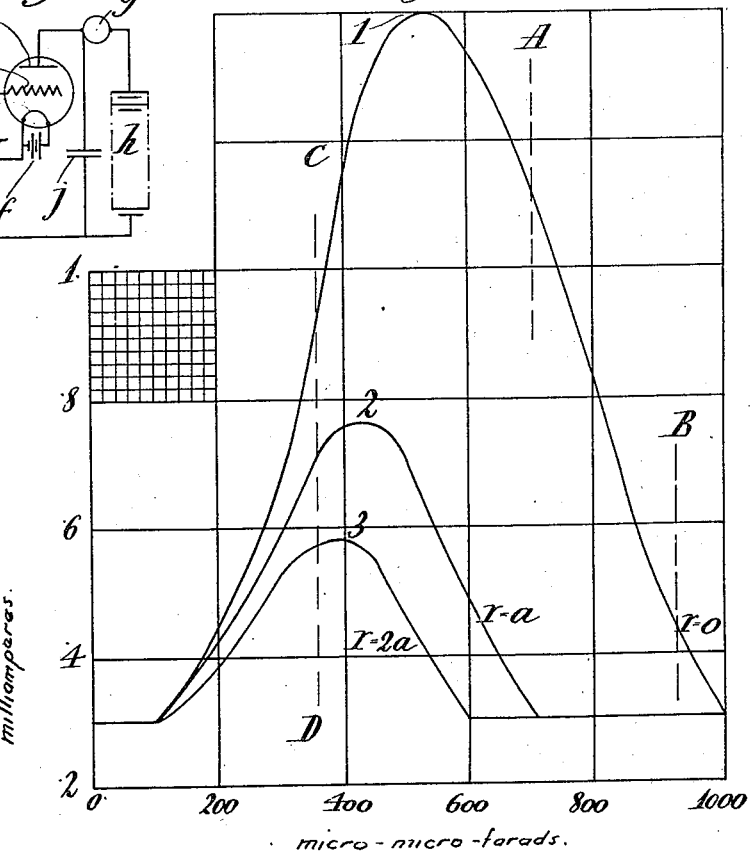
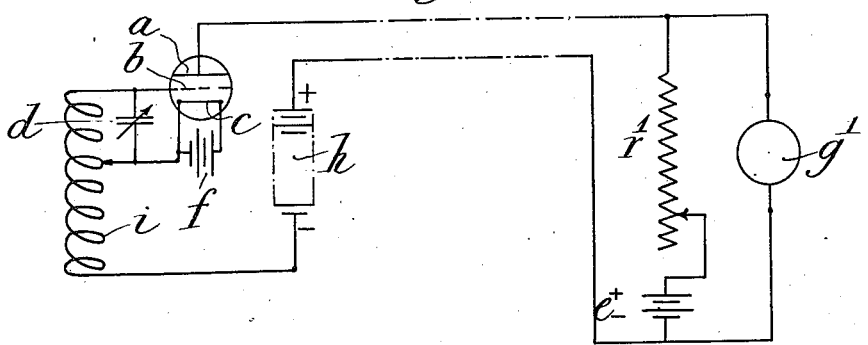

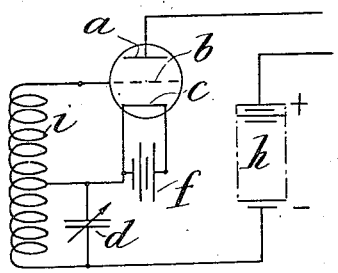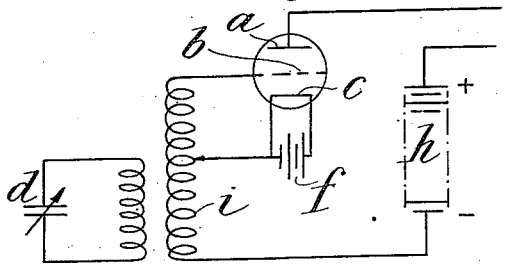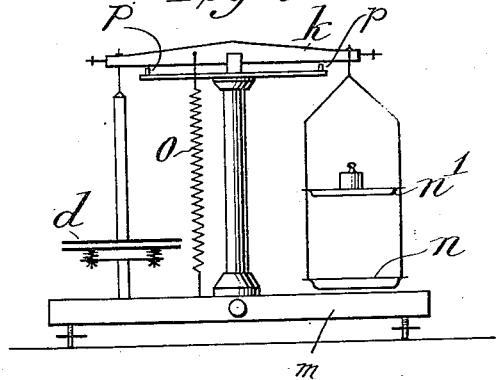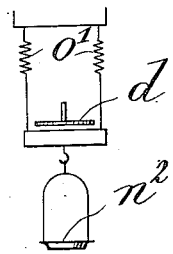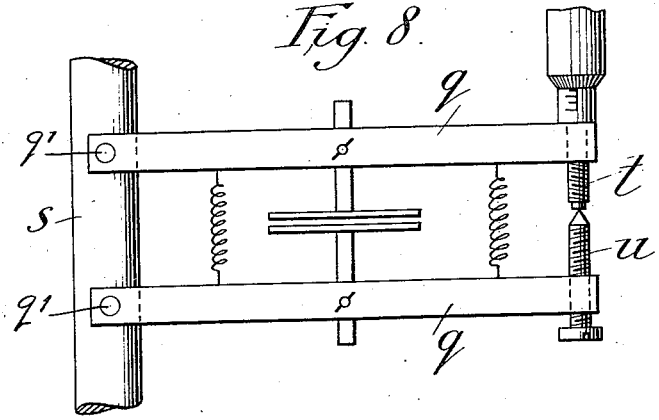

Patented Oct. 10, 1922.

1,431,638

UNITED STATES PATENT OFFICE.

JOHN JOSEPH DOWLING, OF RATHGAR, IRELAND.

ELECTRICAL MEANS FOR DETECTING, OBSERVING, INDICATING, MEASURING, OR UTILIZING MINUTE MOVEMENTS.

Application filed May 17, 1921. Serial No. 470,241.

*To all whom it may concern:*

Be it known that I, JOHN JOSEPH DOWLING, a subject of the King of Great Britain and Ireland, residing at Rathgar, in the county of Dublin, Ireland, have invented Improvements in or Relating to Electrical Means for Detecting, Observing, Indicating, Measuring, or Utilizing Minute Movements, of which the following is a specification.

In an oscillating three electrode thermionic valve circuit the plate current will in general undergo considerable variations if the capacity of the condenser in the oscillatory circuit is changed, assuming that the inductances, coupling, resistances and like characteristics of the circuits remain unaltered. For example, with a valve circuit in which the condenser is influenced by and influences an oscillatory circuit between the grid and filament of the valve, it will be found that, as the capacity of this condenser is varied between the limits within which oscillations are possible, the plate current fluctuates between a maximum and a minimum value, one of these corresponding to the condition of no oscillations.

The object of the present invention is to make use of this phenomenon for sundry practical purposes and consists in arranging that one plate or member of a condenser shall be movable in relation to another thereof, or the remainder of the condenser so that minute mechanical displacements experienced by the condenser can be identified by means of the current fluctuation taking place over the plate of the thermionic valve.

The movable plate or member of the condenser can then be employed as part of an extensometer, a sensitive weight balance, a manometer, or the like, the method of mounting the condenser plate or member being modified to suit the service to which it is to be applied.

The value of the plate current, or any other reading which is a function thereof, may be observed or ascertained by any suitable instrument or apparatus. But in order that the invention may be more readily understood it will be further described with the aid of the accompanying drawings in which Fig. 1 is a diagram of an explanatory circuit employed in obtaining the set of curves shown in Fig. 2. Fig. 3 is a diagram of one circuit arrangement according to the invention and Figs. 4 and 5 are diagrams of modified portions of Fig. 3. Figs. 6 and 7 are diagrammatic views of weight-determining arrangements according to the invention and Fig. 8 is a similar view of a dimension-determining or micrometer arrangement. In Fig. 1 $a$ is the plate, $b$ the grid and $c$ the filament of an ordinary thermionic valve, $d$ being a variable condenser connected to the grid and filament and to an inductance $i$ at two points in the length thereof. $f$ is an accumulator for heating the filament $c$, $g$ is a galvanometer and $h$ an operating battery in the plate circuit whilst $r$ is a resistance in the oscillatory circuit.

The extent of the total variation of current in the plate depends on the ohmic resistance of the oscillatory circuit, being the greater as the resistance is smaller.

For a chosen setting of the inductances and the like a family of curves may be drawn shewing how the plate current varies with the capacity for different resistances. Such curves usually approximate to the form shown in Fig. 2 if the valve be oscillating near the lower part of its "characteristic" curve, but the smooth contours may be distorted, or even a second maximum may be in evidence under certain conditions. I have found this to occur when working the valve at high voltages, or on the upper part of its characteristic, but particularly in the case where a rather small "blocking condenser" $j$ Fig. 1 is inserted in parallel with the plate battery. It appears always possible to obtain smooth curves by introducing a sufficiently large blocking condenser for this purpose. Of these curves 1 represents conditions which may exist when $r=o$. Curve 2 represents the conditions obtaining when other things remaining unaltered $r=a$ or say 20 ohms, whilst curve 3 represents the conditions when $r$ is increased to $2a$.

If the condenser $d$ be formed of two parallel plates, separated by air or any other fluid dielectric, and if the variation of its capacity be due to a displacement of amount "$x$" of one of these plates normally to itself, it has been found that the plate current undergoes a corresponding variation, the amount of which is almost in direct proportion to the magnitude of "$x$"; provided that "$x$" has such values as correspond to variations of capacity throughout a certain region A B of the "capacity current" curve. With certain settings of the inductances, etc., in the circuit a total variation of "$x$" of even half a millimeter has been obtained using condenser plates about 7 cms. in diameter, and the relation between the anode current variations and the displacement "$x$" was almost linear throughout. It can be shown theoretically that the condition for this to occur is that the curve from A to B should be a portion of an hyperbola. The above principles have been found in practice to apply to any arrangement of oscillatory valve circuit. Amongst others, that shown diagrammatically in Fig. 3 and these embodying the modifications of Figs. 4 and 5 have been tried and found to display these characteristics, but the form shown in Figure 3 is advantageous as it is very simple in design, rather more sensitive and at the same time less influenced by outside accidental disturbances such as "capacity effects" than the others.

Whilst in Fig. 3 the condenser $d$ is connected directly across the grid and filament of the valve, in Fig. 4, it is connected across the filament direct and the plate through the plate battery $h$. In Fig. 5 the condenser is included in a local circuit inductively linked to the inductance $i$. Even when a valve is not oscillating a large current will be passing in the plate circuit, the magnitude of which of course depends, inter alia, on the grid potential. In practice it is always possible to work near the lower end of the characteristic curve so that the plate current is at a minimum when there are no oscillations. The plate current will then be, perhaps, half a milliampere but may increase up to several milliamperes as the variable condenser $d$ in the oscillatory circuit is altered over the oscillating range. It is thus impossible to use a sensitive galvanometer to record the changes in the plate current, and the following device is adopted in preference to a potentio-meter or a bridge method, which could, however, be employed if desired.

Between the valve plate $a$ and the positive terminal of the battery $h$, a suitable adjustable resistance $r^1$ and a subsidiary source of current $e$ are connected in series, the negative terminal of the latter being nearest the positive terminal of the main current source. In parallel with these a sensitive galvanometer $g^1$ may be connected provided that the value of $r^1$ is so adjusted that the fall of potential along $r^1$ due to the plate current is almost equal to the electromotive force of the subsidiary current source $e$, for under these conditions the difference of potential between the galvanometer terminals may be made very small. There will be no current through the galvanometer $g^1$ if the plate current is equal to $e/r^1$; but if the plate current alters from this value by an amount $i$, the galvanometer resistance being $r^2$ a current $\frac{r^1}{r^1+r^2} \times i$ will pass through the galvanometer. It is clearly necessary that $r^1$ should be much greater than $r^2$ to retain the full sensitivity of the galvanometer, while reduced sensitivity of the arrangement may be obtained by reducing $r^1$ and $e$ or increasing the resistance $r^2$ of the galvanometer branch.

The principle as explained fully above, viz: the identification of a minute relative movement of the plates of a condenser with a corresponding large deflection of a galvanometric recording device, may be applied in various ways to the measurement, or recording, of such small effects as can be reduced to, or converted into, or are themselves linear displacements.

For example as shown in Fig. 6 one plate of the variable condenser $d$ may be suspended from the beam $k$ of a balance whilst the other plate is rigidly carried by the base $m$ thereof. $n$ and $n^1$ are a pair of scale pans suspended from the other end of the beam and $o$ is a spring set to secure balance with a weight of say 200 grammes inserted in the pan $n^1$. If then this weight be removed and replaced by weights which together with material placed in the pan $n$ approximate to 200 grammes the galvanometer deflections of any of the arrangements of Figs. 3, 4 and 5 may be made to indicate in milligrammes the difference from that value, which galvanometer reading in conjunction with the weights employed in the pan $n^1$ will enable the weight of the material in pan $n$ to be rapidly determined. The spring $o$ is obviously not essential but acts to reduce sensitivity of the balance. $p$ are the usual beam arresting devices.

Or as a further modification an arrangement such as shown in Fig. 7 may be employed where a scale pan $n^2$ is attached to one plate of the condenser and directly supported as by a pair of springs $o^1$, the other condenser plate being stationary.

As already referred to relative movement between the plates of the variable condenser $d$ may be variously effected due to say torsion, elongation, flexure or other alteration in the physical property of a member under observation.

In like manner the condenser plates may as shown in Fig. 8 be adjustably carried by a pair of members $q$ connected together at one end as by set screws $q^1$ either to a standard distance piece $s$ or a specimen of which the longitudinal extension or compression is to be determined and provided at the opposite end with a micrometer screw $t$ and adjustable abutment $u$ between which lateral and transverse strains may be determined.

The arms of the members $q$ at opposite sides of the condenser may be of equal or unequal lengths.

What I claim is:—

1. The combination with a thermionic valve, having a plate, grid and filament, of a variable condenser influenced by and influencing an oscillatory circuit between the grid and filament aforesaid, a source of current, an inductance connected to the grid and one terminal of the source of current, a galvanometer having one terminal connected to the opposite terminal of the source of current, and its other terminal connected to the plate of the valve, an adjustable resistance and auxiliary source of current connected in series across the terminals of the galvanometer, and means for altering the capacity of the condenser the said alteration in condenser capacity producing a variation in the plate circuit current observable in the galvanometer, for purposes such as described.

2. The combination with a thermionic valve, having a plate, grid and filament, of a variable condenser connected to the grid and filament and forming an oscillatory circuit, a source of current, an inductance connected to the grid and one terminal of the source of current, a galvanometer having one terminal connected to the opposite terminal of the source of current, and its other terminal connected to the plate of the valve, an adjustable resistance and an auxiliary source of current connected in series across the terminals of the galvanometer, and means for altering the capacity of the condenser, the said alteration in condenser capacity producing a variation in the plate circuit current observable in the galvanometer, for purposes such as described.

3. The combination with a thermionic valve, having a plate, grid and filament, of a variable condenser influenced by and influencing an oscillatory circuit between the grid and filament aforesaid, a source of current, an inductance connected to the grid and one terminal of the source of current, a galvanometer having one terminal connected to the opposite terminal of the source of current, and its other terminal connected to the plate of the valve, an adjustable resistance and an auxiliary source of current connected in series across the terminals of the galvanometer and a balance having a beam to one end of which a part of the variable condenser is secured, movement of the balance beam altering the capacity of the condenser and indicating on the galvanometer any minute difference between actual weight dealt with by the balance and a predetermined weight.

4. The combination with a thermionic valve, having a plate, grid and filament, of a variable condenser connected to the grid and filament and forming an oscillatory circuit, a source of current, an inductance connected to the grid and one terminal of the source of current, a galvanometer having one terminal connected to the opposite terminal of the source of current, and its other terminal connected to the plate of the valve, an adjustable resistance and an auxiliary source of current connected in series across the terminals of the galvanometer, and a balance having a beam to one end of which a part of the variable condenser is secured, movement of the balance beam altering the capacity of the condenser and indicating on the galvanometer any minute difference between actual weight dealt with by the balance and a predetermined weight.

Signed at Dublin, Ireland, this twenty-seventh day of April, 1921.

JOHN JOSEPH DOWLING.